(12) United States Patent
Li et al.

(10) Patent No.: US 6,299,214 B1
(45) Date of Patent: Oct. 9, 2001

(54) ISOLATION DEVICE AND FLUID CONNECTION

(75) Inventors: Wen L. Li, Fayetteville; Mark A. Daniels, Manlius; Patrick C. Marks, Minoa; Shau-Tak R. Chou, Fayetteville, all of NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/393,484

(22) Filed: Sep. 10, 1999

(51) Int. Cl.$^7$ .................................................. F16L 11/12
(52) U.S. Cl. .................................. 285/49; 285/48; 285/50
(58) Field of Search ................................ 285/49, 48, 50, 285/53, 54, 52

(56) References Cited

U.S. PATENT DOCUMENTS

| 2,126,706 | * | 8/1938 | Schmidt . |
| 3,566,510 | * | 3/1971 | Wendt . |

FOREIGN PATENT DOCUMENTS

| 101531 | * | 7/1937 | (AU) | ...................................... 285/50 |
| 2087023 | * | 5/1982 | (GB) | ...................................... 285/48 |

* cited by examiner

*Primary Examiner*—Teri Pham Luu

(57) ABSTRACT

An annular isolator is provided having a metal tube which acts as a spring while defining a flow path and a resilient member located between two loading plates. The resilient member supports the weight of one of the members being coupled and the tube acts as spring as to transmitting vibration.

16 Claims, 2 Drawing Sheets

ISOLATION DEVICE AND FLUID CONNECTION

BACKGROUND OF THE INVENTION

Rigid connections between structural members in a mechanical system can be a path of vibrational propagation between members. One arrangement in which this can occur is in a refrigeration system chiller where a compressor is mounted on a heat exchanger through a rigid connection that serves as a fluid path between the members.

Screw compressors, especially high, speed geared compressors, generate high levels of structure borne energy in a frequency range where components of the systems in which they are typically applied are very responsive. This often leads to unacceptably high radiated sound levels from both the compressor and the rigidly attached system components. The problem is particularly acute with compressors designed to be directly mounted on a heat exchanger shell such that the compressor is fully supported by a flange extending directly from the shell. This is because this joint tends to transmit energy very efficiently from the compressor to the heat exchanger shell. Reducing this transmission by conventional means such as elastomeric or helical springs is very difficult due to the conflicting requirements placed on the joint. Specifically, the joint must hermetically contain the refrigerant, withstand the operating pressure in the system, and be structurally robust, especially if the joint represents the sole support for the compressor. Additionally, space requirements are often very restrictive since minimizing package size is critical.

SUMMARY OF THE INVENTION

The present invention is essentially a stand alone insertion installed between two flanges and providing a fluid path. A flexible metal tube acts as a spring to isolate vibration while defining a portion of the fluid path thereby fully containing the refrigerant. Hence, the present invention can be incorporated without requiring any major design changes. A piece of elastomer such as rubber or neoprene is located radially outward of the metal tube and between a pair of metal loading plates. The two plates are used to hold together the flanges of the members being coupled while the elastomer is compressed due to its supporting the weight of one of the members, the compressor.

It is an object of this invention to reduce heat exchanger vibration due to compressor excitation in a refrigeration or air conditioning system.

It is another object of this invention to reduce structure borne sound resulting from compressor operation It is an additional object of this invention to reduce overall sound radiation from a chiller.

It is a further object of this invention to provide an axially compact vibration isolator. These objects, and others as will become apparent hereinafter, are accomplished by the present invention.

Basically, an annular isolator is provided having a metal tube or conduit which acts as a spring while defining a flow path and a resilient member located between two loading plates which supports the weight of one of the members being coupled and the metal tube or conduit acts as a spring as to transmitting vibration.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
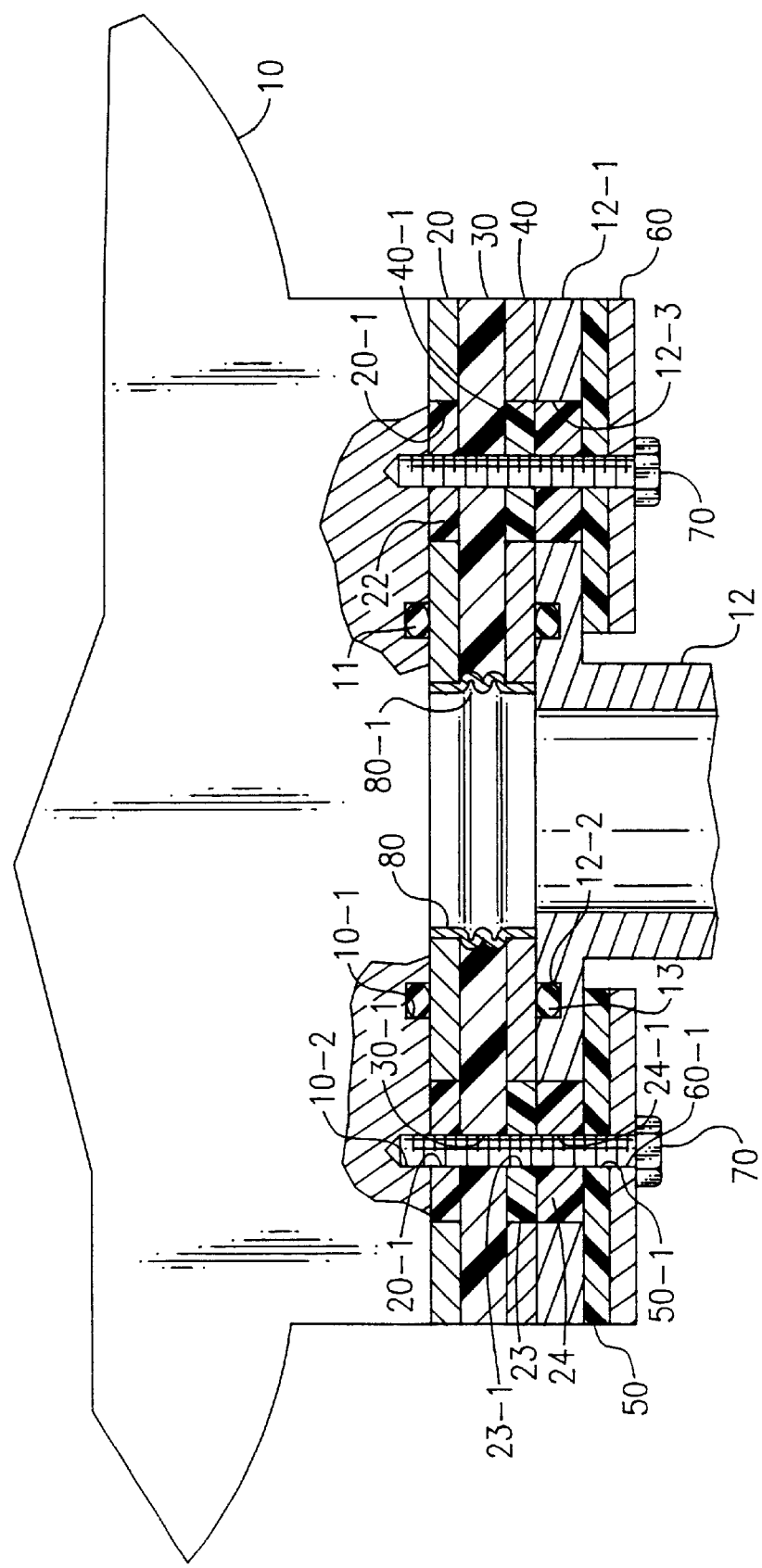
FIG. 1 is a sectional view of the present invention providing vibration isolation and a fluid connection between a compressor and a heat exchanger.
Figure 2:
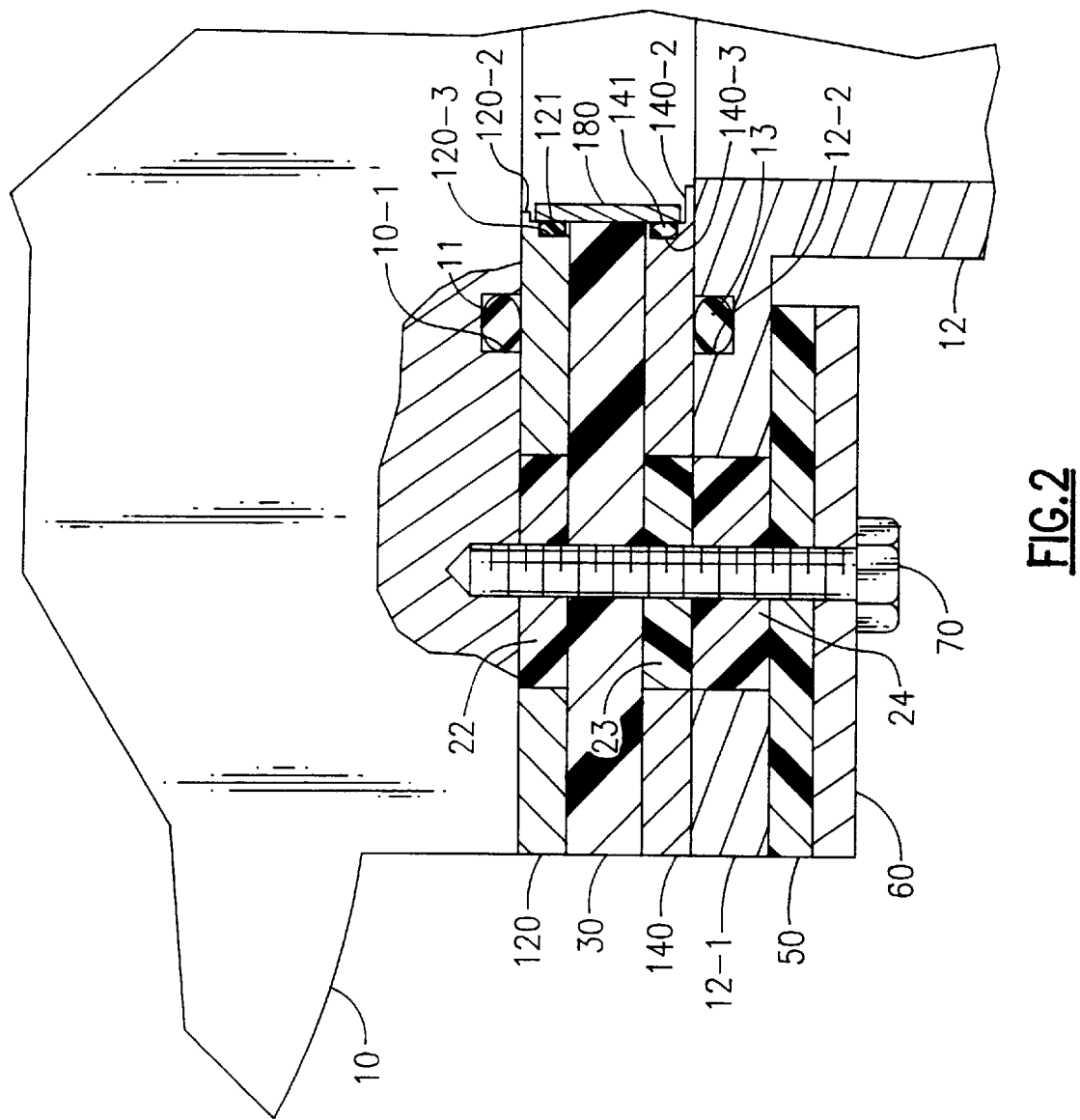
FIG. 2 is a partial sectional view of a modified embodiment of the present invention.

In FIGS. 1 and 2 the numeral 10 generally designates a refrigerant compressor, such as a screw compressor, and the numeral 12 designates a heat exchanger such as a cooler or evaporator of a refrigeration or air conditioning system. Compressor 10 has an annular groove 10-1 which receives o-ring 11. Cooler 12 has a flange 12-1 with an annular groove 12-2 which receives o-ring 13.

Referring specifically to FIG. 1, compressor 10 engages and is supported by annular metal ring 20 which overlies elastomeric member 30. Annular member 30 may be made up of two semicircular members or a single member with a radial slit to permit manipulation for installation. Elastomeric member 30 overlies annular metal ring 40 which, in turn, overlies flange 12-1. Corrugated tube 80 is located within and surrounded by members 20, 30 and 40. Tube 80 is welded or otherwise suitably secured to members 20 and 40 in a fluid tight manner. Alternatively, tube 80 can be formed integral with member 20 and/or 40. Also, member 20 can be made integral with compressor 10 and/or member 40 can be made integral with flange 12-1, which would eliminate the need for o-ring 11 and/or 13 and the grooves to receive them. Members 20 and 40 and flange 12-1 have a plurality of circumferentially spaced bores 20-1, 40-1 and 12-3, respectively, having elastomeric sleeves 22, 23 and 24, respectively, located therein. Annular steel plate 60 is massive in the sense that it will not deflect when bolted in place and in that it provides a large surface area for contacting elastomeric member 50. Annular member 50 is made of an elastomeric material such as rubber or neoprene and may be made up of two, or more, partial circular members or a single member with a radial slit to permit installation.

Circumferentially spaced bolts 70 extend serially through bores 60-1, 50-1, 24-1, 23-1, 30-1, 20-1 in members 60, 50, 24, 23, 30 and 20, respectively, before being threaded into threaded bore 10-2 in compressor 10.

Bolts 70 are tightened to the extent that members 20, 30, 40, 12-1 and 50 are squeezed into intimate contact between compressor 10 and plate 60. Accordingly, o-ring 11 provides a fluid seal between compressor 10 and plate 20. Similarly, o-ring 13 provides a fluid seal between cooler flange 12-1 and plate 40. Tube 80 protects member 30 from exposure to refrigerant or other fluid passing between heat exchanger 12 and compressor 10. While tube 80 is integral with members 20 and 40, it connects members 20 and 40 in a flexible manner due to its corrugations 80-1 such that it acts in the nature of a spring relative to transmitting vibrations. The only other metal-to-metal contact is the heads of bolts 70 contacting plate 60 and bolts 70 being threaded into threaded bores 10-2 but this transmission path is interrupted by elastomeric member 30 which supports the weight of compressor 10 and elastomeric member 50 which is compressed between plate 60 and flange 12-1 by the threading of bolts 70 into threaded bores 10-2.

It will be noted that the axial separation of compressor 10 and heat exchanger 12 is increased only by the thickness of members 20, 30 and 40 which would be on the order of 0.75 inches or 20 mm. Further, elastomeric member 30 effectively vibrationally isolates compressor 10 and heat exchanger 12 and provides extreme damping since it is supporting the weight of compressor 10 and is subject to the further compression and resulting damping due to the tightening of bolts 70.

Referring now to FIG. 2, corrugated tube 80 has been replaced with an annular tubular member 180 which is put in place by virtue of an interference fit. Plate 120 corresponds to plate 20 but has a small, inwardly radially extending circumferential lip 120-2 and a circumferential recess 120-3 for receiving o-ring 121. Plate 140 corresponds to plate 40 but has a inwardly radially extending circumferential lip 140-2 and a circumferential recess 140-3 for receiving o-ring 141. The rest of the structure of FIG. 2 is the same as that of FIG. 1.

As noted, tubular member 180 is set in place by an interference fit. Specifically, member 180 can be cooled sufficiently so that it can pass through the opening defined by lip 120-2 and set in place such that upon reaching ambient temperature it will be in an interference fit and in sealing engagement with o-rings 121 and 141. Although there is metal-to-metal contact between tubular member 180 and plates 120 and 140, tubular member 180 is capable of relative axial movement, within the constraints of lips 120-2 and 140-2, relative to plates 120 and 140 such that, effectively, there is a resilient connection between member 180 and members 120 and 140 relative to transmitting vibrations. As in the FIG. 1 embodiment, compressor 10 can incorporate plate 120 and/or flange 12-1 can incorporate plate 140.

Although preferred embodiments of the present invention have been specifically illustrated an described, other changes will occur to those skilled in the art. For example the description has been specific to a chiller but is applicable to other fluid connections, such as in fluid pipelines. It is therefore intended that the scope of the present invention is to be limited only by the scope of the appended claims.

What is claimed is:

1. Apparatus comprising a first structural member and a second structural member and an isolation device and fluid connection for fluidly connecting said first and second structural members wherein said first structural member is supported by said isolation device and fluid connection and said second structural member and wherein said isolation device and fluid connection further comprises:

a first rigid plate having an opening therein and a first and second side with said first side adapted to engage said first structural member in a fluid tight relationship;

a second rigid plate having an opening therein and a first and a second side with said second side adapted to engage said second structural member in a fluid tight relationship;

a resilient member located between said second side of said first plate and said first side of said second plate and having an opening aligned with said openings in said first and second plates said resilient member supporting said first rigid plate and said first structural member;

a flexible member located in and lining said openings in said first and second plates and said resilient member so as to define a portion of a fluid path between said first and second structural members;

means for securing said flexible member to said first and second plates whereby a fluid type relationship is maintained between said flexible member and said first and second plates;

means for securing said first side of said first plate to said first structural member whereby said first side of said first plate is in a fluid tight relationship with said first structural member; and means for securing said second side of said second rigid plate to said second structural member whereby said second side of said second rigid plate is in a fluid tight relationship with said second structural member.

2. The apparatus of claim 1 wherein said flexible member is a corrugated metal tube.

3. The apparatus of claim 1 wherein said flexible member is a tubular member.

4. The apparatus of claim 1 further including means for securing said first and second structural members together with said isolation device therebetween.

5. The apparatus of claim 4 wherein said means for securing said first and second structural members together with said isolation device includes:

a flange with circumferentially spaced openings in said second structural member;

threaded holes in said first structural member;

bores in said first and second rigid plates and said resilient member; and said openings in said flange and said threaded holes and said bores in said first and second rigid plates and said resilient member being aligned so as to permit bolts to extend through said openings in said flange and said bores in said first and second rigid plates and said resilient member and to be threaded into said threaded holes.

6. The apparatus of claim 5 wherein said bores in said first and second rigid plates are lined with resilient sleeves.

7. The apparatus of claim 1 wherein said first structural member is a compressor and wherein said second structural member is a heat exchanger receiving compressed fluid from the compressor via said flexible member.

8. The apparatus of claim 7 wherein said heat exchanger is beneath said compressor so as to support the weight of said compressor.

9. Apparatus comprising a first structural member and a second structural member and an isolation device and fluid connection for fluidly connecting said first and second structural members wherein said first structural member is supported by said isolation and fluid connection and said second structural member and wherein said isolation device and fluid connection further comprises:

a first rigid plate having an opening therein and a first side;

a second rigid plate having an opening therein and a first side;

a resilient member located between said first side of said first plate and said first side of said second plate and having an opening aligned with said openings in said first and second plates said resilient member supporting said first rigid plate and said first structural member;

a flexible member located in and lining said openings in said first and second plates and said resilient member so as to define a portion of a fluid path between said first and second structural members; and means for securing said flexible member to said first and second plates whereby a fluid tight relationship is maintained between said flexible member and said first and second plates.

10. The apparatus of claim 9 wherein said flexible member is a corrugated metal tube.

11. The apparatus of claim 9 wherein said means for securing said flexible member to said first and second plates is an interference bit.

12. The apparatus of claim 9 further including means for securing said first and second structural members together with said isolation device therebetween.

13. The apparatus of claim 12 wherein said means for securing said first and second structural members together with said isolation device includes:
   a flange with circumferentially spaced openings in said second structural member;
   threaded holes in said first structural member;
   bores in said first and second rigid plates and said resilient member;
   said openings in said flange and said threaded holes and said bores in said first and second rigid plates and said resilient member being aligned so as to permit bolts to extend through said openings in said flange and said bores in said first and second rigid plates and said resilient member and to be threaded into said threaded holes.

14. The apparatus of claim 13 wherein said bores in said first and second rigid plates are lined with resilient sleeves.

15. The apparatus of claim 7 wherein said first structural member is a compressor and wherein said second structural member is a heat exchanger receiving compressed fluid from the compressor via said flexible member.

16. The apparatus of claim 15 wherein said heat exchanger is beneath said compressor so as to support the weight of said compressor.

* * * * *